(12) United States Patent
De Groot

(10) Patent No.: US 6,278,960 B1
(45) Date of Patent: Aug. 21, 2001

(54) ASSEMBLY FOR REMOTE CONTROL AND/OR REMOTE OPERATION OF A FIELD DEVICE BY MEANS OF A CONTROLLER VIA A FIELD BUS

(75) Inventor: Vincent De Groot, Wehr (DE)

(73) Assignee: Endress + Hauser GmbH + Co., Maulburg (DE)

( * ) Notice: Subject to any disclaimer, the term of this patent is extended or adjusted under 35 U.S.C. 154(b) by 0 days.

(21) Appl. No.: 09/178,864

(22) Filed: Oct. 26, 1998

Related U.S. Application Data
(60) Provisional application No. 60/077,325, filed on Mar. 9, 1998.

(30) Foreign Application Priority Data

Oct. 31, 1997 (EP) .................................................. 97119053

(51) Int. Cl.$^7$ ..................................................... G06F 9/00
(52) U.S. Cl. .................................. 702/188; 717/1; 717/4; 717/5
(58) Field of Search .................... 702/188; 709/227–228, 709/230–232, 250; 717/1, 4–5, 7, 9–11

(56) References Cited

U.S. PATENT DOCUMENTS

| | | |
|---|---|---|
| 5,542,082 | 7/1996 | Solhjell . |
| 5,875,335 | 2/1999 | Beard . |
| 5,935,249 * | 8/1999 | Stern et al. ............................ 709/250 |
| 5,958,013 * | 9/1999 | King et al. ............................. 709/250 |
| 5,966,540 * | 10/1999 | Lister et al. ............................ 717/11 |
| 5,987,256 * | 11/1999 | Wu et al. .................................. 717/7 |
| 6,009,517 | 12/1999 | Bak et al. . |
| 6,011,916 * | 1/2000 | Moore et al. ............................. 717/1 |

FOREIGN PATENT DOCUMENTS

| | | |
|---|---|---|
| 196 15 190 | 10/1997 | (DE) . |
| 0 489 227 | 6/1992 | (EP) . |
| 3-84700 | 4/1991 | (JP) . |
| 4170824 | 6/1992 | (JP) . |
| 6-331398 | 12/1994 | (JP) . |
| WO 97/39393 | 10/1997 | (WO) . |

OTHER PUBLICATIONS

*Nikkei Electronics*, Jul. 14, 1997 (No. 694), pp 200–201 (With English Language Translation).
*Nikkei Computer*, Jun. 24, 1996 (No. 394), pp. 128–129.
*Nikkei Computer*, Jul. 10, 1995 (No. 369), pp. 75–76.
Pinkowski, Gunter, "Instrumentation throughout the times from smart technology to a manufacturer independent man–machine interface", 8130 ATP Automatisierungstechnische Praxis, 6/92, No. 6, pp. 325–327.
Pinkowski, Gunter, "Bloβ nichts Spezielles!", 312 Elektrotechnik fuer die Automatisierung, Nov. 20, 1995,No. 11, pp. 26–31.

* cited by examiner

*Primary Examiner*—Kamini Shah
*Assistant Examiner*—Bryan Bui
(74) *Attorney, Agent, or Firm*—Bose McKinney & Evans LLP

(57) ABSTRACT

In an assembly for remote control and/or remote operation of a field device by a controller via a field bus a program code describing the functionality of this device is stored in the field device. The field device contains a processor in which the program code is implementable. The controller is equipped with a run-time environment in which the program code can be run following transfer from the field device to the controller via the field bus. The remote control and/or remote operation of the field device is implementable by transferring field device parameters via the field bus in the run-time environment.

2 Claims, 2 Drawing Sheets

ASSEMBLY FOR REMOTE CONTROL AND/OR REMOTE OPERATION OF A FIELD DEVICE BY MEANS OF A CONTROLLER VIA A FIELD BUS

This appln claims the benefit of Provisional No. 60/077,325 filed Mar. 9, 1998.

FIELD OF THE INVENTION

The invention relates to an assembly for remote control and/or remote operation of a field device by means of a controller via a field bus.

BACKGROUND OF THE INVENTION

In industrial production systems field devices are in use as a rule in a wealth of positions which can be remotely controlled or operated from a central location via a field bus. "Field devices" is the general term designating sensors and actuators employed in systems in which industrial processes are run. Such field devices may be pressure gauges with the aid of which the pressure in a container can be measured and monitored. However, temperature gauges may also be involved with the aid of which the temperature can be monitored at a desired location in the process sequence. A level sensor may also be put to use as a field device for monitoring the level in a container. Increasing use is being made of smart devices as field devices which offer substantially more possibilities of application than more conventional devices for data acquisition. Smart field devices are capable of not only processing the acquired data, they also make it possible to engineer the parameters of the field devices with the aid of e.g. a pc-based controller incorporated at the central location or also by means of a portable controller via the field bus in on-line or even off-line operation. For example, depending on the requirements a variety of design data values or also limiting values of measuring data as well as range data values can be transmitted via the field bus to the field devices. To achieve this functionality a description of the field device parameters is required for the application program stored in the field device. This description can be viewed as an eighth layer of the OSI layer model created as a standard description of a network architecture for which various so-called device description languages (DDLs) are defined which can be employed for this purpose. These device description languages describe not only the attributes of the field device parameters but also the dependencies or relationships between the parameters and attributes.

However, the approach described hitherto for remote control and remote operation of field devices by working with device description languages has numerous drawbacks. There is no assurance that the device description (DD) produced for a field device in using one of the languages correctly describes the functionality of the device. For complex field devices it is extremely difficult to produce a device description which is consistent with the functionality of the parameters of the field device, there being to date no tool available with the aid of which the device code can be converted into a device description or for producing the device code from a device description. Device description languages exist in great variety, specific to certain controllers, this meaning that a dedicated device description needs to be written for each combination of field device and controller. As soon as a new device is to be put to use or the software of an existing device needs to be updated this usually involves the device description needing to be updated which then has to be transferred to the controller. This is usually done by entering the updated device description into the controller with the aid of a diskette which can easily lead to version problems.

A simplified example of an assembly of the aforementioned kind is shown in FIG. 1. The field device 101 is provided with a memory 102 in which a processor-specific binary code is stored. This binary code is generated usually with the aid of an assembler/C source code from one or more data files 103 and processing in an assembly, a compiler and a linker, these programs being dictated in a block 104. In the field device 101 the binary code is then processed in a suitable processor 105. The controller 108 connected to the field device 101 via the field bus 106 consists of a universal part designated the DD shell and work surface 109. In addition the controller contains a flexible field device specific part 110 into which the DD code can be entered. This DD code represents the functionality specific to the field device in each case. The DD code is e.g. a dynamic link library (DLL), and is entered into the flexible part 110 via a diskette 113. The DD code is generated by a DD compiler 112 operating with application of one or more DD source data files 111. The transmission of the device parameters between the field device 101 and the controller 108, as indicated by the arrows 107, is handled by the field bus 106.

SUMMARY OF THE INVENTION

The invention is based on the object of providing an assembly of the aforementioned kind which obviates the drawbacks as described above.

This object is achieved by the features as set forth in claim 1.

Programming the field device application in a programming language, the compiler of which generates a platform-independent program code and using a microprocessor capable of processing this code results in a field device capable of executing a platform-independent code. By inserting the parameter attributes and the dependencies or relationships in a software architecture responsible for separating the system functionality and the closely hardware-related functionality of the field device, and by adding a possibility for transferring the program code representing the parameters in the controller this platform-independent program code can be processed in the controller. It is now no longer necessary by using such a method to write field device data files for the field device, and the field device has access to a consistent device functionality ensuring error-free operation.

BRIEF DESCRIPTION OF THE DRAWINGS

One example embodiment of the invention will now be explained in more detail with reference to the drawing in which.

DESCRIPTION OF THE PREFERRED EMBODIMENT

Figure 1:
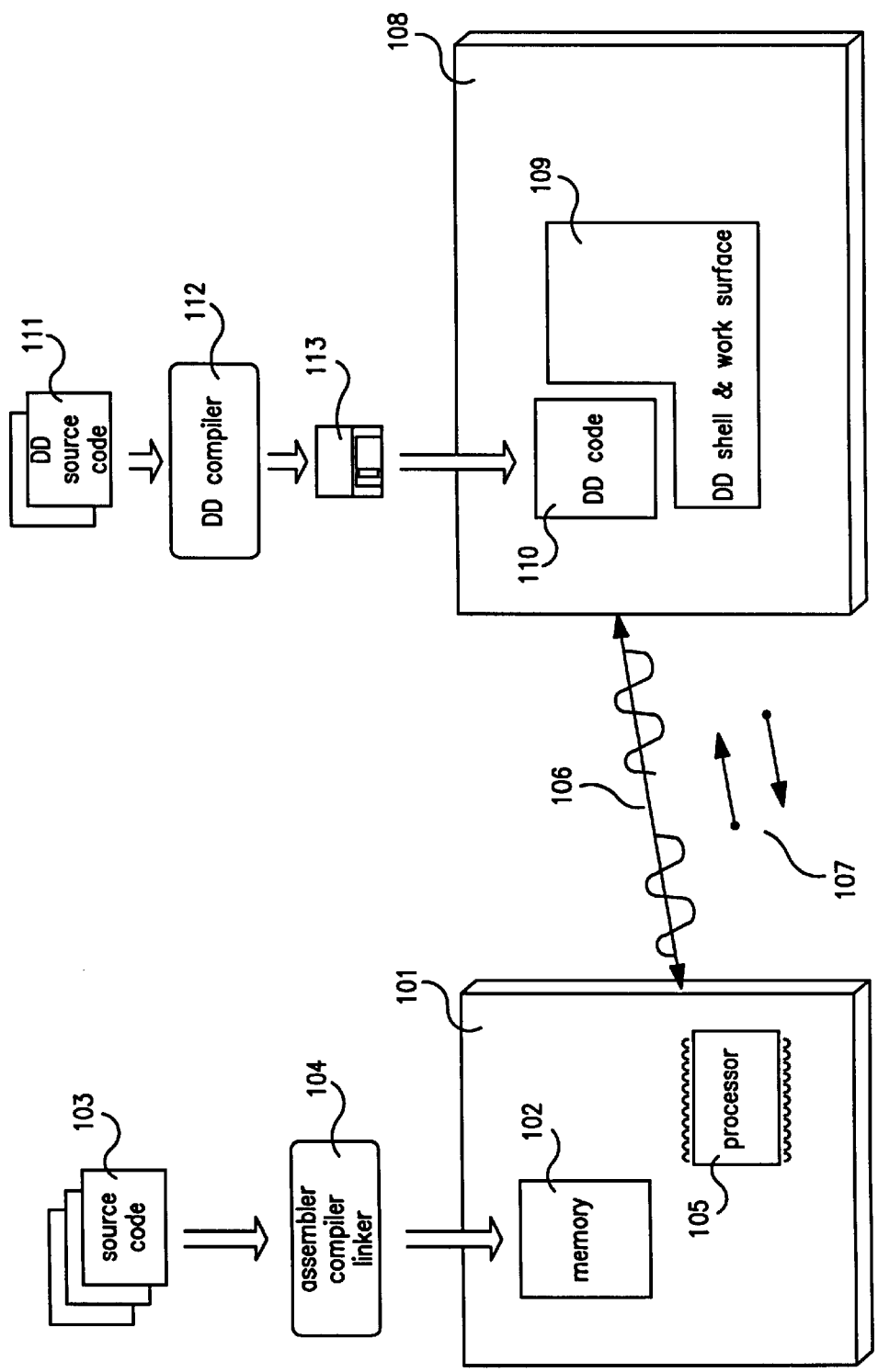
FIG. 1 is a simplified illustration of the assembly as explained above in accordance with the prior art.
Figure 2:
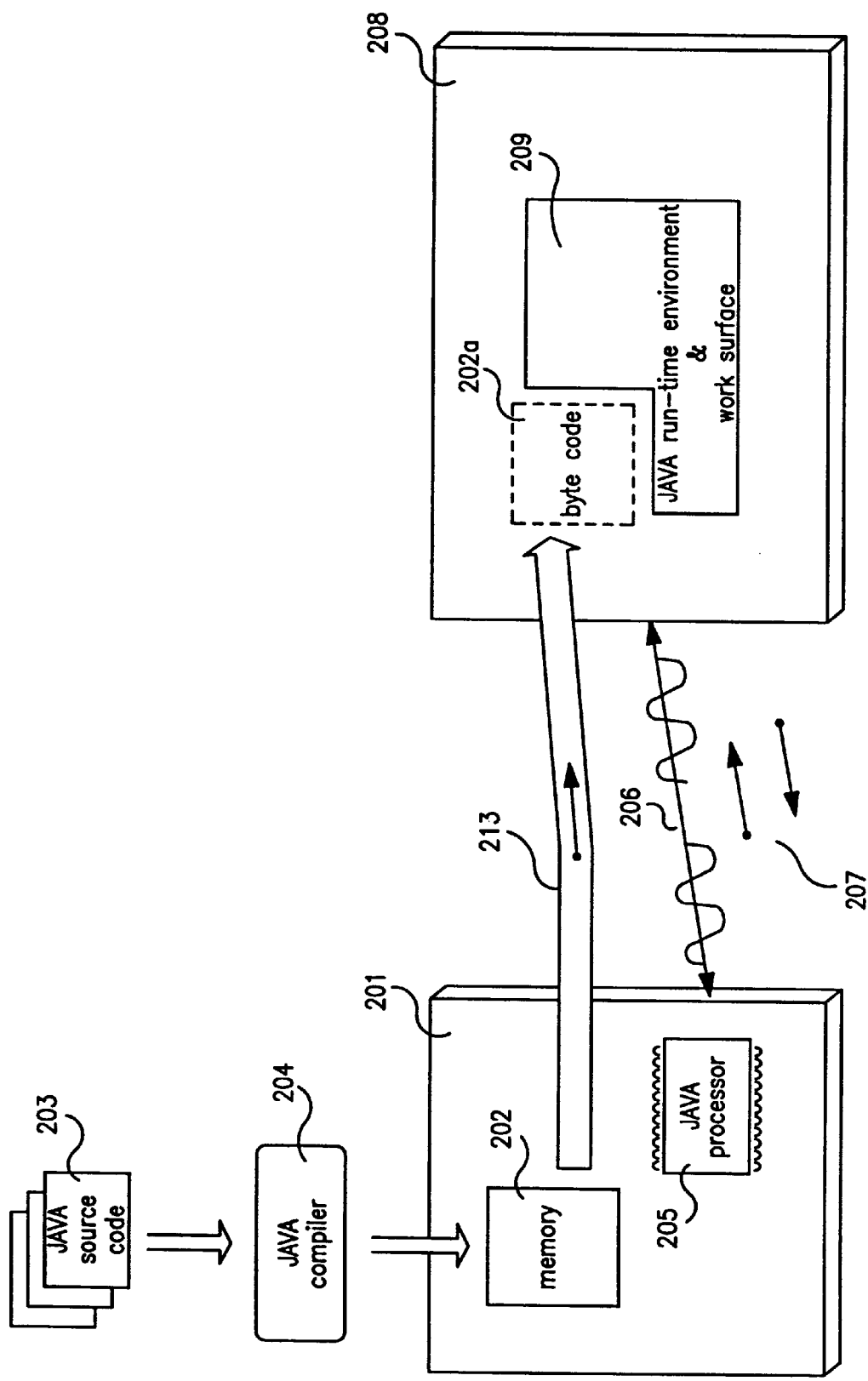
FIG. 2 is a schematic illustration of an assembly in accordance with the invention.

The assembly as shown in FIG. 2 is characterized in that the field device description is produced using the JAVA programming language (JAVA is a trademark of Sun Microsystems). However, any other programming language may be used as long as it permits generating a platform-independent program code. This forms the basis for configuring the assembly so that the aforementioned drawbacks of conventional systems no longer occur.

The field device 201 contains a memory 202 in which a JAVA byte code is stored, generated by means of a JAVA source code from one or more data files 203 with the aid of a JAVA compiler 204. A special JAVA processor 205 implements the JAVA byte code in the field device. Via a field bus 206 device parameters 207 can be transported between a controller 208 and the field device 201. The JAVA byte code can be transmitted via the field bus 206 to the controller 208 as indicated schematically by the link 213. This JAVA byte code is stored in a memory 202*a* in the controller, this code being platform-independent so that the objects responsible for the parameter description can be made use of in the controller 208 by a JAVA run-time environment and a corresponding work surface. This environment is indicated in FIG. 2 schematically at 209. Due to the existence of the JAVA run-time environment in the controller 108 the JAVA byte code serving to replace the device description used hitherto can be processed in the controller irrespective of the platform on which this environment is placed.

What is claimed is:

1. An assembly for remote control and remote operation of a field device by means of a controller via a field bus wherein in said field device a program code describing the functionality of said device is stored, said field device containing a processor in which the program code is implementable, said controller being equipped with a run-time environment in which said program code can be run following transfer from said field device to said controller via said field bus so that remote control and remote operation of said field device is implementable by transferring field device parameters via said field bus in said run-time environment, wherein said field device parameters are, among other things, limiting values of measuring data, design, and range data values.

2. The assembly as set forth in claim 1 wherein said program code is a JAVA byte code, said processor is a JAVA processor and said run-time environment is a JAVA run-time environment.

* * * * *